United States Patent Office 3,219,643
Patented Nov. 23, 1965

3,219,643
METHOD OF PREPARING ACRYLONITRILE POLYMER AND COPOLYMERS IN THE PRESENCE OF SULFUR DIOXIDE AS COLOR INHIBITOR
Hiroshi Uchiyama and Hiroshi Kiuchi, Ohtsu-shi, Shiga-ken, and Hiroshi Kumahara, Minami-ku, Nagoya, Japan, assignors to Toyo Rayon Kabushiki Kaisha, Tokyo, Japan, a corporation of Japan
No Drawing. Filed Nov. 13, 1962, Ser. No. 237,318
Claims priority, application Japan, Nov. 30, 1961, 36/42,629
2 Claims. (Cl. 260—85.5)

This invention relates to a method of preparing acrylonitrile polymers and copolymers of a degree of polymerization suitable for rendering into fibers and having coloration preventive properties, and also a method of preparing therefrom excellent fibers of high degree of whiteness, it being particularly related to an improved method of obtaining a spinning solution of low coloration by the solution polymerization of acrylonitriles in dimethyl sulfoxide. More specifically, the invention relates to a method of preparing acrylonitrile polymers and copolymers which comprises, in the solution polymerization in dimethyl sulfoxide of acrylonitrile singly or more than 85% of acrylonitrile in combination with other polymerizable unsaturated vinyl compounds using azobis compounds as the catalyst, adding to the reaction system sulfur dioxide as the coloration inhibitor and beta-styrene sulfonic acid or the salts thereof as the chain transfer agent, and effecting the polymerization reaction.

Although acrylonitrile polymers are originally white in color, they have a tendency to gradually discolor during the processes of polymerization, dissolving, drying, spinning, etc., when being prepared on a commercial scale, the color changing to yellow and, in extreme instances, even brown. This phenomenon of the discoloration of acrylonitrile polymers is a matter that is being pointed out as being a great problem in recent years.

Even in the past there have been several instances of attempts being made to prevent coloration in preparing acrylonitrile polymers and copolymers by adding certain kinds of substances. However, instances are very rare in which attempts have been made for preventing coloration occurring during solution polymerization. Namely, since there are various difficult conditions required in carrying out the method of adding to the solution during polymerization a substance which will prevent coloration, the situation is such that neither an excellent additive nor method has as yet been attained.

It is an object of the present invention to provide in preparing such acrylonitrile polymers and copolymers a method of obtaining by means of the solution polymerization method a spinning solution which has a degree of polymerization suitable for rendering into fibers and a degree of coloration that is slight, thereby to provide fibers of acrylonitrile polymers and copolymers excelling remarkably in their whiteness.

Another object of the invention is to provide in such a solution polymerization method a method of preventing the occurrence of coloration during the polymerization reaction and an additive suitable therefor.

Other objects and advantages of the invention will become apparent from the following description thereof.

When sulfur dioxide was added to prevent the coloration that occurred during the polymerization reaction in the spinning solution, though excellent coloration preventive results were manifested without the occurrence of ill effects on the polymerization reaction when sulfur dioxide was added in an amount less than 5 g./l. based on the solution being polymerized, we found that when, for obtaining a polymer of a degree of polymerization suitable for fibers, the conventionally employed dodecyl mercaptan, hypophosphoric acid, allyl alcohol, etc. were added as the chain transfer agent, these chain transfer agents and sulfur dioxide would react as to practically destroy the action of the chain transfer agents.

Therefore, in spite of the fact that sulfur dioxide should also have excellent coloration preventive action in the solution polymerization of acrylonitrile polymers and copolymers, it cannot be utilized for obtaining polymers or copolymers having a degree of polymerization suitable for fibers.

Upon furthering our research, we found that by means of beta-styrene sulfonic acid or the salts thereof the degree of polymerization of the polymer or copolymer could be adjusted, at will, with a very small amount and without changing the polymerization rate, and that even though sulfur dioxide was present together in the solution being polymerized, beta-sulfonic acid or the salts thereof was not affected whatsoever thereby.

Accordingly, the objects of the present invention are achieved by adding to the reaction system sulfur dioxide as the coloration inhibitor and beta-sulfonic acid or the salts thereof as the chain transfer agent in polymerizing in dimethyl sulfoxide acrylonitrile singly or more than 85% of acrylonitrile in combination with other polymerizable unsaturated vinyl compounds using azobis compounds as the catalyst.

The most important feature of the invention is that in polymerizing acrylonitrile in solution the reaction is carried out in the copresence of sulfur dioxide which, without affecting the reaction adversely, by holding to a minimum the coloration that occurs to the spinning solution during the reaction, is very useful for obtaining a spinning solution whose coloration is slight, and beta-styrene sulfonic acid or the salts thereof which despite the copresence of such a coloration inhibitor acts as an effective chain transfer agent, whereby is provided a method of preparing acrylonitrile polymers or copolymers having a degree of polymerization suitable for spinning into fibers, the whiteness of which is remarkably excellent.

In this invention, the polymerization temperature considered from the point of coloration should be preferably below 65° C., and since from the point of the polymerization rate a temperature of above 40° C. is necessary, a range of 40–65° C. will do. The monomer concentration is preferably within the range of 15–35% by weight, and the azobis compounds used as the catalyst should be preferably within the range of 0.2–5% by weight, based on the monomers being polymerized. On the other hand, a range of 0.05–5 g./l. of the beta-sulfonic acid or the salts thereof is preferred. For preventing the coloration which is caused by iron ions a chelating compound such as ethylene diamine tetraacetic acid may also be added. And as the salts of beta-styrene sulfonic acid there can be named the salts of the alkali metals such as sodium, potassium, lithium, etc., the salts of the alkaline earth metals such as magnesium, calcium, strontium, barium, etc., the ammonium salts, and the organic amine salts.

Preferred as the water content of the dimethyl sulfoxide to be used is an amount no more than 5%. The polymerizable unsaturated compounds which are to be copolymerized with acrylonitrile include acrylic acid, methacrylic acid and their corresponding esters, acrylic amide and methacrylic amide the alkyl substituted substances thereof, vinylidene chloride, vinyl chloride and vinyl acetate, the vinyl carboxylates such as vinyl chloroacetate, and vinyl benzoate, the alkyl substituted substances of vinyl pyridine such as 2-vinyl pyridine and 2-methyl-5-vinyl pyridine, alkenyl aromatic sulfonic acids such as styrene sulfonic acid or the salts thereof, vinyl sulfonic acid or the salts thereof, allyl sulfonic acid or the salts thereof, methallyl sulfonic acid or the salts thereof etc.

Next, the coloration preventive action of sulfur dioxide will be described by means of a reference example.

REFERENCE 1

In order to test the coloration preventive action of sulfur dioxide, the solution polymerization reactions were carried out for 24 hours at 55° C. by adding 20 parts of acrylonitrile, 1 part of methyl acrylate, 0.3 part of sodium allyl sulfonate, 80 parts of dimethyl sulfoxide, and 0.3 part of azobis isobutyronitrile, but without using a chain transfer agent. The quantities of sulfur dioxide added and the corresponding colour indices after polymerizing for 24 hours were as shown in Table I, below.

Table I

| Quantity of Sulfur Dioxide Added (pt. by wt.) | Colour Index After Polymerizing for 24 Hours |
|---|---|
| 0 | 10.4 |
| 0.03 | 4.8 |
| 0.05 | 3.3 |
| 0.1 | 2.8 |
| 0.2 | 2.6 |
| 0.5 | 2.4 |

The colour index is the average value of the intensity of absorptions 425 m$\mu$, 550 m$\mu$, and 650 m$\mu$.

As apparent from the above Table I, it is evident that sulfur dioxide becomes a very excellent coloration inhibitor in the solution polymerization of acrylonitrile polymers.

However, as already mentioned hereinbefore, when attempts are made to obtain polymers or copolymers of a degree of polymerization suitable for fibers ($[\eta]$1.0–1.7) by effecting its copresence with a chain transfer agent such as dodecyl mercaptan, hydrophosphoric acid, aryl alcohol, etc., the sulfur dioxide reacts with these chain transfer agents thereby hindering the action of the chain transfer agents as to render impossible the attainment of the desired object.

Therefore, in order to attain the objects of the present invention, it becomes necessary to use either beta-styrene sulfonic acid or salts thereof.

For a clearer understanding of the invention, the following examples are given illustrating the mode of practicing the invention. It is to be understood, however, that these are merely illustrative and not in limitation of the invention.

EXAMPLE 1

In polymerizing for 30 hours at 50° C. by adding 20 parts of acrylonitrile, 0.3 part of sodium allyl sulfonate, 80 parts of dimethyl sulfoxide and 0.32 part of azobis isobutyronitrile, 0.04 part of a chain transfer agent dodecyl mercaptan or beta-styrene sulfonic acid was added with or without incorporating 0.1 part of sulfur dioxide as the coloration inhibitor. A comparison of the results obtained are shown in Table II, below.

As apparent from Table II, above, according to the present invention an acrylonitrile polymer or copolymer having a degree of polymerization, as indicated by its $[\eta]$, suitable for spinning into fibers, and having also remarkable coloration preventive effects is provided.

On the other hand, when solution polymerization is carried out by effecting the copresence with sulfur dioxide of other chain transfer agents, although, as apparent from Control 1, even though coloration preventive effects are seen, the effect of the chain transfer agent is lost and only a polymer having a degree of polymerization which manifests a high $[\eta]$ that approximates the instance of Control 2 in which a chain transfer agent was not used can be obtained. Further, when sulfur dioxide is not incorporated, even though beta-styrene sulfonic acid or the salts thereof are employed, the degree of coloration, as shown by Controls 3–5, is high. Thus, it can be seen that the objects of this invention are not attained.

EXAMPLE 2

A mixture consisting of 20 parts of acrylonitrile, 1 part of methyl acrylate, 0.3 part of sodium allyl sulfonic acid, 0.32 part of azobis isobutyronitrile 0.04 part of beta-styrene sulfonate, 0.1 part of sulfur dioxide, 0.03 part of ethylene diamine tetraacetic acid, and 79 parts of dimethyl sulfoxide was polymerized for 30 hours at 50° C. in a stream of nitrogen. The rate of polymerization was 92%, $[\eta]$ of the copolymer, 1.51, and the colour index of the spinning solution, 2.3.

EXAMPLE 3

After removal of the bubbles from the spinning solution obtained in Example 2, it was spun through a spinneret having 7000 holes each 0.08 mm. in diameter into a 50% aqueous solution of dimethyl sulfoxide of 30° C. at a discharge rate of 120 grams per minute, thereby forming filaments. The filaments, which were transparent in the bath, were taken up at the rate of 3 m./min. after traveling through the bath for an immersed distance of 3 meters. This undrawn fiber was immediately fed into a 30% aqueous solution of dimethyl sulfoxide (temperature 95° C.) and was drawn 5× during its travel through an immersed distance of 3 meters. The rate at which fiber passed through the second bath was 15 m./min. This fiber was then fed to a 15% aqueous solution of dimethyl sulfoxide (temperature 98° C.), followed by passing through water at room temperature for 30 minutes, whereupon the residual dimethyl sulfoxide was thoroughly washed and removed. While the so obtained fiber maintains its transparency, not losing transparency even if air dried, for after treatment and in order to impart practicality, it was dried for 7 minutes in a drier at 100° C., thus reducing the water content to not more than 3%. The appearance of the fiber so obtained is white in color and exceeding lustrous, there being seen no loss at all of its transparency. No cavities are present in its section which is homogeneous with no distinguishable skin or core. The physical properties of the resulting fiber was excellent, it having a tenacity of 3.55 g./d., an elongation of 39%, and knot strength (tenacity) ratio of 85%. The degree of whiteness of the fiber, if represented by the reflectance rate of 480 m$\mu$, was 88%.

Table II

| Examples | Amount Added of Sulfur Dioxide (pt. by wt.) | Amount Added of Chain Transfer Agent (pt. by wt.) | Colour Index | $[\eta]$ of Polymer |
|---|---|---|---|---|
| Example 1 | 0.1 | Beta-styrene sulfonic acid, 0.04 | 2.3 | 1.49 |
| Control 1 | 0.1 | Dodecyl mercaptan, 0.04 | 2.3 | 1.80 |
| Control 2 | 0.1 | Not added | 2.3 | 1.91 |
| Control 3 | Not added | Dodecyl mercaptan, 0.04 | 10.0 | 1.42 |
| Control 4 | do | Beta-styrene sulfonic acid, 0.04 | 10.2 | 1.48 |
| Control 5 | do | Not added | 10.4 | 2.10 |

Although generally the fiber takes on a yellowish green tinge when an azo compound has been used as a catalyst in solution polymerization, the fiber obtained, as above, manifested practically no yellowish green tinge. As regards its dyeability, when Basic Blue GO in an amount of 3% based on the fiber weight was used, and dyeing was carried out for 1 hour at 98° C. with the bath ratio being 1:100, the dye exhaustion ratio was 74%.

Having thus described the nature of the invention, what we claim is:

1. In a process for polymerizing a monomer composition containing from 85% to 100% acrylonitrile and up to 15% of a copolymerizable ethylenically unsaturated vinyl compound in dimethyl sulfoxide and using an azobis compound as the catalyst to prepare acrylonitrile polymers, the improvement which comprises adding to the reaction system sulfur dioxide as a coloration inhibitor and as a chain transfer agent 0.05–5 grams per liter of a compound selected from the group consisting of β-styrene sulfonic acid and the salts thereof thereafter affecting the polymerization reaction in the presence of said chain transfer agent and coloration inhibitor at a temperature in the range of from about 40 to about 65° C.

2. A method in accordance with claim 1 wherein the quantity of the catalyst is 0.2–5% by weight based on the weight of the monomer and the monomer concentration is 15–35% by weight.

References Cited by the Examiner
UNITED STATES PATENTS

| | | | |
|---|---|---|---|
| 2,858,290 | 10/1958 | Davis et al. | 260—85.5 |
| 2,911,397 | 11/1959 | Jansen et al. | 260—88.7 |
| 2,916,477 | 12/1959 | Ott | 260—88.7 |
| 3,025,278 | 3/1962 | Pitts | 260—88.7 |
| 3,100,761 | 8/1963 | Fellman et al. | 260—88.7 |
| 3,135,812 | 6/1964 | Taniyama et al. | 264—182 |
| 3,147,322 | 9/1964 | Fujisaki et al. | 264—182 |

JOSEPH L. SCHOFER, *Primary Examiner.*

DONALD E. CZAJA, *Examiner.*